(12) United States Patent
Dindar et al.

(10) Patent No.: US 12,552,534 B2
(45) Date of Patent: Feb. 17, 2026

(54) BLENDED WING BODY AIRCRAFT

(71) Applicant: General Electric Company, Schenectady, NY (US)

(72) Inventors: Mustafa Dindar, Cincinnati, OH (US); Timothy Richard DePuy, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/658,909

(22) Filed: Apr. 12, 2022

(65) Prior Publication Data

US 2023/0322382 A1    Oct. 12, 2023

(51) Int. Cl.
| | |
|---|---|
| *B64C 39/10* | (2006.01) |
| *B64C 21/01* | (2023.01) |
| *B64D 27/12* | (2006.01) |
| *B64D 33/02* | (2006.01) |

(52) U.S. Cl.
CPC .............. *B64C 39/10* (2013.01); *B64C 21/01* (2023.01); *B64D 27/12* (2013.01); *B64D 33/02* (2013.01); *B64C 2039/105* (2013.01); *B64D 2033/0206* (2013.01)

(58) Field of Classification Search
CPC ... B64C 39/10; B64C 2039/105; B64C 21/01; B64C 27/08; B64C 27/14; B64C 27/20; B64C 2033/0206; B64C 33/02; B64C 1/16; B64D 27/00; B64D 27/14
See application file for complete search history.

(56) References Cited

U.S. PATENT DOCUMENTS

| | | | |
|---|---|---|---|
| 3,532,305 A | 10/1970 | Madelung | |
| 5,082,204 A * | 1/1992 | Croston | B64C 39/066 244/89 |
| 6,527,224 B2 | 3/2003 | Seidel | |
| 6,568,632 B2 | 5/2003 | Page et al. | |
| 6,575,406 B2 | 6/2003 | Nelson | |
| 6,938,854 B2 | 9/2005 | Nelson | |
| 7,644,888 B2 | 1/2010 | Eakins et al. | |
| 8,152,095 B2 | 4/2012 | Cazals et al. | |
| 10,384,796 B2 | 8/2019 | Alexander | |
| 10,988,232 B2 | 4/2021 | Crawford | |

(Continued)

FOREIGN PATENT DOCUMENTS

| | | |
|---|---|---|
| CN | 106286010 A | 1/2017 |
| CN | 109677608 A | 4/2019 |

(Continued)

*Primary Examiner* — Joshua D Huson
*Assistant Examiner* — Peter A Taraschi
(74) *Attorney, Agent, or Firm* — Dority & Manning, P.A.

(57) ABSTRACT

A blended wing body aircraft includes a body section having an aerodynamic lifting surface. The body section includes an upper body and a lower body. The blended wing body aircraft also includes a plurality of blended wing sections further defining the body section. The blended wing body aircraft includes one or more grooves in the body section. The one or more grooves extend from the upper body towards the lower body. The blended wing body aircraft further includes one or more open-fan engines mounted at least partially within the one or more grooves. The one or more open-fan engines ingest a portion of a boundary layer of the blended wing body aircraft.

16 Claims, 9 Drawing Sheets

(56) References Cited

U.S. PATENT DOCUMENTS

| | | | |
|---|---|---|---|
| 11,718,403 B2* | 8/2023 | Rahrig | B64D 29/02 |
| | | | 244/12.6 |
| 2008/0121756 A1 | 5/2008 | McComb | |
| 2010/0163670 A1 | 7/2010 | Dizdarevic et al. | |
| 2011/0121130 A1 | 5/2011 | Odle et al. | |
| 2011/0210211 A1* | 9/2011 | Zha | B64C 21/025 |
| | | | 416/91 |
| 2018/0339765 A1* | 11/2018 | Epstein | B64C 23/02 |
| 2022/0025814 A1 | 1/2022 | Wood et al. | |
| 2022/0033067 A1* | 2/2022 | Page | F02K 1/46 |
| 2023/0264801 A1* | 8/2023 | Lazzara | B64C 7/02 |
| | | | 244/130 |

FOREIGN PATENT DOCUMENTS

| | | |
|---|---|---|
| CN | 109808900 A | 5/2019 |
| CN | 112660381 A | 4/2021 |
| CN | 113002785 A | 6/2021 |
| CN | 113062803 A | 7/2021 |
| CN | 113291459 A | 8/2021 |
| CN | 113978697 A | 1/2022 |
| WO | 2017098374 A1 | 6/2017 |

* cited by examiner

BLENDED WING BODY AIRCRAFT

TECHNICAL FIELD

The present disclosure relates to blended wing body aircraft.

BACKGROUND

A blended wing body aircraft is a fixed-wing aircraft that has distinct wing and body structures that are smoothly blended together with no clear dividing line. Typical blended wing body aircraft include high-lift wings and a wide airfoil-shaped body. The wings and the wide airfoil-shaped body enable the entire aircraft to contribute to lift generation. The blended wing body aircraft includes engines mounted thereon for providing propulsion for the blended wing body aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, a two, a four, a ten, a fifteen, or a twenty percent margin in either individual values, range(s) of values and/or endpoints defining range(s) of values.

As may be used herein, the term "axial" refers to a direction and to an orientation that extends substantially parallel to a centerline of the blended wing body aircraft. Moreover, the terms "radial" and "radially" refer to directions and to orientations that extend substantially perpendicular to the centerline of the blended wing body aircraft. In addition, as used herein, the terms "circumferential" and "circumferentially" refer to directions and to orientations that extend about the centerline of the blended wing body aircraft.

In the aerospace industry, a focus has been made on producing environmentally friendly aircraft. One method of reducing emissions has been focused on alternative fuel technologies, such as, for example, hydrogen fuels or electric batteries. Such alternative fuels, however, require additional storage onboard the aircraft as compared to traditional fuels. Current conventional aircraft, such as tube-and-wing aircraft, do not provide adequate storage space for such alternative fuels. Further, increasing a size of the conventional aircraft to compensate for additional storage would decrease the range capabilities of such aircraft due to increased weight. Thus, the present disclosure provides for a blended wing body aircraft. The blended wing body aircraft provides additional storage space as compared to the conventional aircraft, while also maintaining long range capabilities and increased efficiency as compared to the conventional aircraft.

The present disclosure also provides for open-fan propulsors, also referred to as open-fan engines, for the blended wing body aircraft. Open-fan engines further provide improvements to overall efficiency as compared to turbofan engines or to turboprop engines. Open-fan engines, such as propfan engines, include unducted fans for providing an ultra-high bypass ratio. In this way, open-fan engines improve propulsive efficiency compared to ducted fan engines (e.g., turbofan engines). The propulsive efficiency of the open-fan engines can further be increased by embedding the open-fan engines within a boundary layer of the blended wing body aircraft. Embedding the open-fan engines within the boundary layer allows the open-fan engines to utilize boundary layer ingestion. Boundary layer ingestion includes the open-fan engines utilizing a portion of the boundary layer such that the fan blades of the open-fan engines ingest the portion of the boundary layer. The open-fan engines accelerate the airflow of the boundary layer. Boundary layer ingestion is primarily intended to further improve overall propulsive efficiency of the open-fan architecture engines. An additional benefit of embedding the open-fan engines within the blended wing body is that such a configuration partially blocks or fully blocks the direct line-of-sight noise propagation of the open-fan engines. This reduces environmental noise and community noise that propagates from the open-fan engines to the ground. In addition, the semi-embedded physical installation of the open-fan architecture within the blended wing body structure helps to mitigate noise concerns by applying appropriate acoustic liners within the walls of the blended wing body aircraft. The acoustic liners help to reduce noise reflections and noise that grazes along and around the blended wing body aircraft. The acoustic liners also reduce noise that propagates into the aircraft cabin.

Open-fan engines, however, are exposed to crosswind effects, debris, and include increased noise as compared to ducted fan engines due the fans of the open-fan engines being uncovered. Further, while ducted fan engines can be mounted at the surfaces of the aircraft (e.g., due to the duct or the shroud providing protection of the fans), open-fan engines require space between the surface of the aircraft and the fan blades so that the fan blades do not contact the surface. In this way, it is difficult to mount the open-fan engines in the boundary layer of the blended wing body aircraft. Thus, the present disclosure provides for mounting of the open-fan engines in one or more grooves in the blended wing body aircraft such that the open-fan engines are embedded within the boundary layer of the blended wing body aircraft. Therefore, the open-fan engines utilize boundary layer ingestion, as detailed above. The open-fan engines are positioned in the one or more grooves to ingest at least one percent of the blended wing body aircraft's boundary layer. Preferably, the open-fan engines are positioned in the one or more grooves to ingest at least twenty percent or more of the blended wing body aircraft's boundary layer. By ingesting at least twenty percent or more of the blended wing-body aircraft's boundary layer, the propulsive efficiency of the open-fan engines can be increased by about three percent or more. Further, mounting the open-fan engines within one or more grooves provides for shielding the open-fan engines from crosswind effects and cross-engine debris. The one or more grooves also provide acoustic dampening effects for the open-fan engines. An acoustic liner can also be mounted within the grooves to further provide for acoustic dampening. Thus, the one or more grooves of the present disclosure allow the open-fan engines to be mounted within the boundary layer of the blended wing body aircraft, while also providing benefits of ducted fan engines (e.g., acoustic dampening, protection from crosswind effects and cross-engine debris) without actually utilizing a ducted fan engine.

Figure 1A:
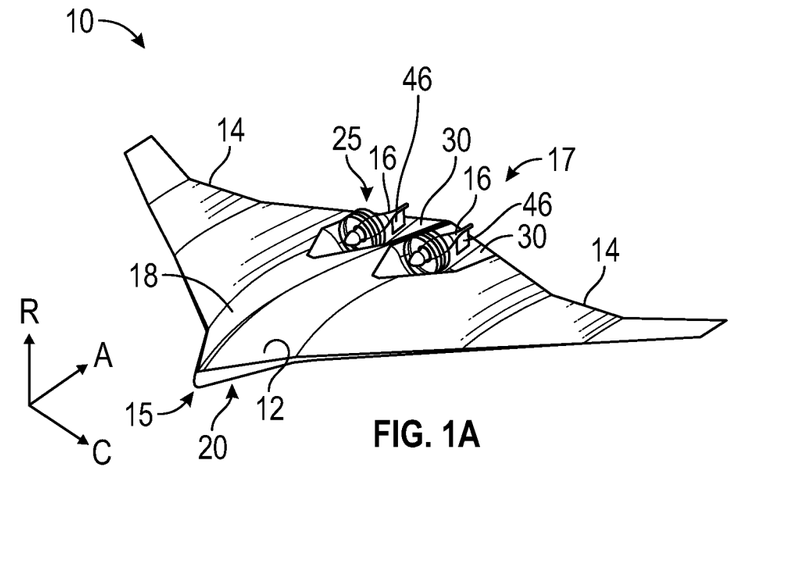
FIG. 1A is a front side view of an exemplary blended wing body aircraft with an open-fan engine mounted thereon, according to an aspect of the present disclosure.
Figure 1B:
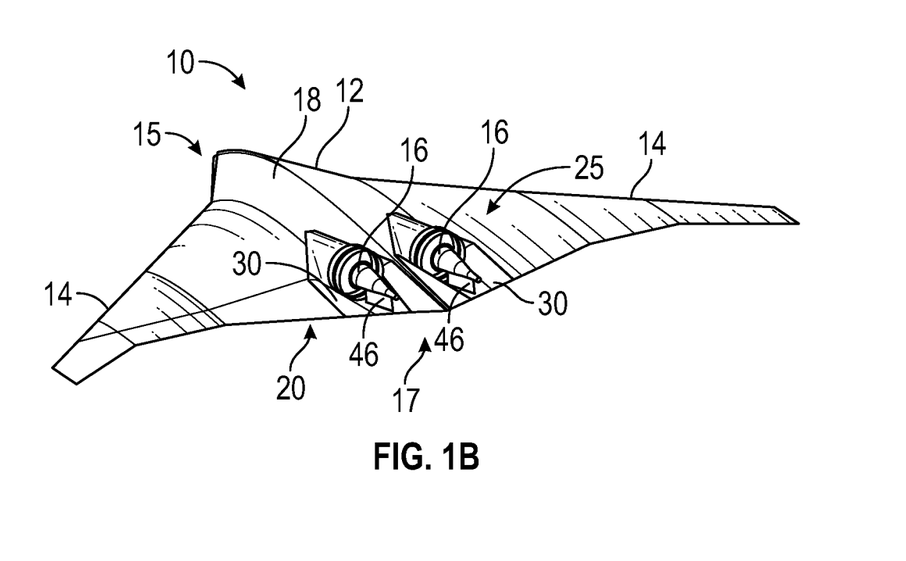
FIG. 1B is a rear side view of the exemplary blended wing body aircraft of FIG. 1A, according to an aspect of the present disclosure.
Figure 1C:
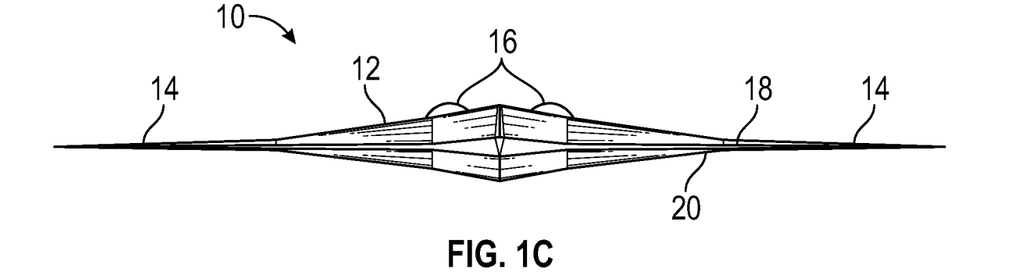
FIG. 1C is a front elevational view of the exemplary blended wing body aircraft of FIG. 1A, according to an aspect of the present disclosure.
Figure 1D:
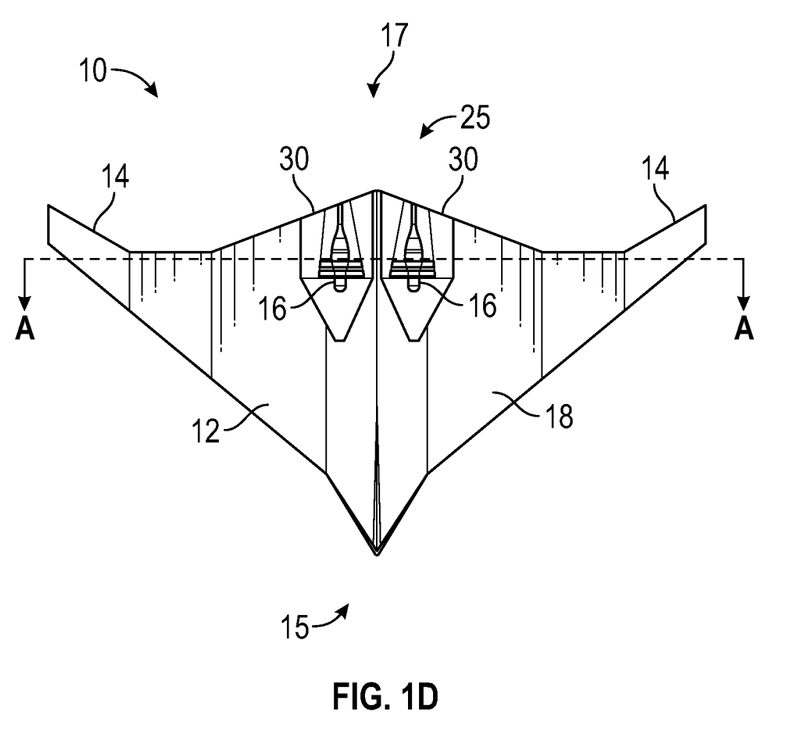
FIG. 1D is a top plan view of the exemplary blended wing body aircraft of FIG. 1A, according to an aspect of the present disclosure.

Referring now to the drawings, FIG. 1A is a front side view of an exemplary blended wing body aircraft 10, also referred to as BWB 10, with one or more open-fan engines 16 mounted thereon, according to an aspect of the present disclosure. FIG. 1B is a rear side view of the BWB 10. FIG. 1C is a front elevational view of the BWB 10. FIG. 1D is a top plan view of the BWB 10. As shown in FIGS. 1A to 1D, BWB 10 includes a body section 12, a plurality of blended wing sections 14, and the one or more open-fan engines 16. The BWB 10 includes an axial direction (A), a circumferential direction (C), and a radial direction (R) as shown in FIG. 1A.

The body section 12 extends from a forward end 15 to an aft end 17. The body section 12 includes an upper body 18 and a lower body 20. An outer surface of the lower body 20 is shaped to provide an aerodynamic lifting surface. Each of the blended wing sections 14 is structurally blended with, and further defines, the body section 12. The structural blending maintains aerodynamic lift continuity from the blended wing sections 14 to the body section 12. For example, the body section 12 and the blended wing sections 14 define a substantially uninterrupted wing member capable of providing aerodynamic lift to the BWB 10 according to known aerodynamic principles. The BWB 10 may also include one or more tail assemblies (e.g., vertical stabilizers and/or horizontal stabilizers) for providing stability and providing control surfaces. The body section 12 may define an interior including a cockpit, a cabin, and/or a cargo area. The BWB 10 includes additional storage space in the interior of the body section 12 as compared to conventional tube-style aircraft. Thus, the BWB 10 may store alternative fuels. For example, the BWB 10 may store hydrogen fuel. In some examples, the BWB 10 may include an electric aircraft, and the BWB 10 may store electric batteries.

The body section 12 includes one or more grooves 30 located at an aft region 25 of the BWB 10. In the embodiment of FIGS. 1A-1D, the one or more grooves 30 include two grooves 30 each for accommodating a single open-fan engine 16. The one or more grooves 30 may, of course, include any number of grooves for accommodating any number of open-fan engines 16, as desired. The one or more grooves 30 are sized and shaped to accommodate the one or more open-fan engines 16. Each of the open-fan engines 16 is attached to a respective groove 30 by one or more pylons 46, as shown in FIGS. 1A and 1B and detailed further below.

Further, the one or more grooves 30 may include a size and/or a shape for embedding the open-fan engines 16 in the boundary layer of the BWB 10, as detailed further below. For example, the one or more grooves 30 are sized and are shaped such that the boundary layer of the BWB 10 in an area of the one or more grooves 30 is thicker as compared to the boundary layer of the BWB 10 without the one or more grooves 30.

Figure 1E:
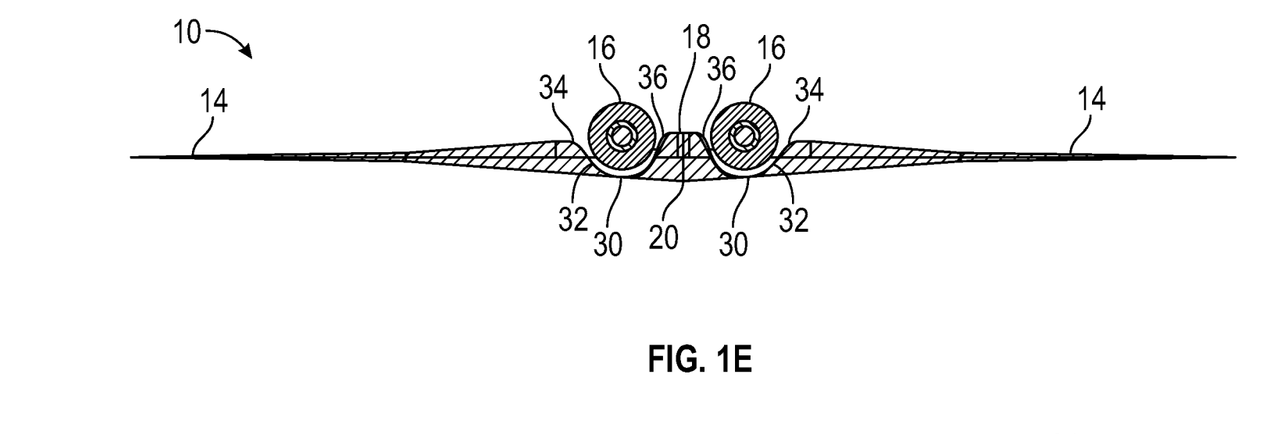
FIG. 1E is a cross-sectional view, taken along line A-A in FIG. 1D, of the exemplary blended wing body aircraft, according to an aspect of the present disclosure.

FIG. 1E is a cross-sectional view, taken along line A-A in FIG. 1D, of the BWB 10. As shown in FIG. 1E, the one or more grooves 30 each includes a circumferential contoured wall 32. The circumferential contoured wall 32 extends in the circumferential direction (C) and defines a contour in the upper body 18 of the body section 12. For example, the circumferential contoured wall 32 extends between a first end 34 and a second end 36. The circumferential contoured wall 32 is contoured between the first end 34 and the second end 36. For example, the circumferential contoured wall 32 includes a generally U-shaped contour. In this way, the circumferential contoured wall 32 extends from the upper body 18 at an upper portion of the circumferential contoured wall 32 and towards the lower body 20 at a lower portion of the circumferential contoured wall 32. The one or more grooves 30 are circumferentially spaced from each other such that the circumferential contoured wall 32 of each groove 30 blends into the upper body 18 and the grooves 30 do not contact each other. In some examples, the circumferential contoured wall 32 of each groove 30 blends into the circumferential contoured wall 32 of an adjacent groove 30.

The circumferential contoured wall 32 may include any shape or any size, as desired, for embedding the open-fan engines 16 in a boundary layer of the BWB 10, as detailed further below. The circumferential contoured wall 32 extends from upper body 18 and blends into an axial contoured wall 38 at an upstream portion and blends into an axial wall 44 at a downstream portion, as shown and detailed below with reference to FIG. 1F. In this way, the circumferential contoured wall 32 blends into the lower body 20 at the downstream portion.

Figure 1F:
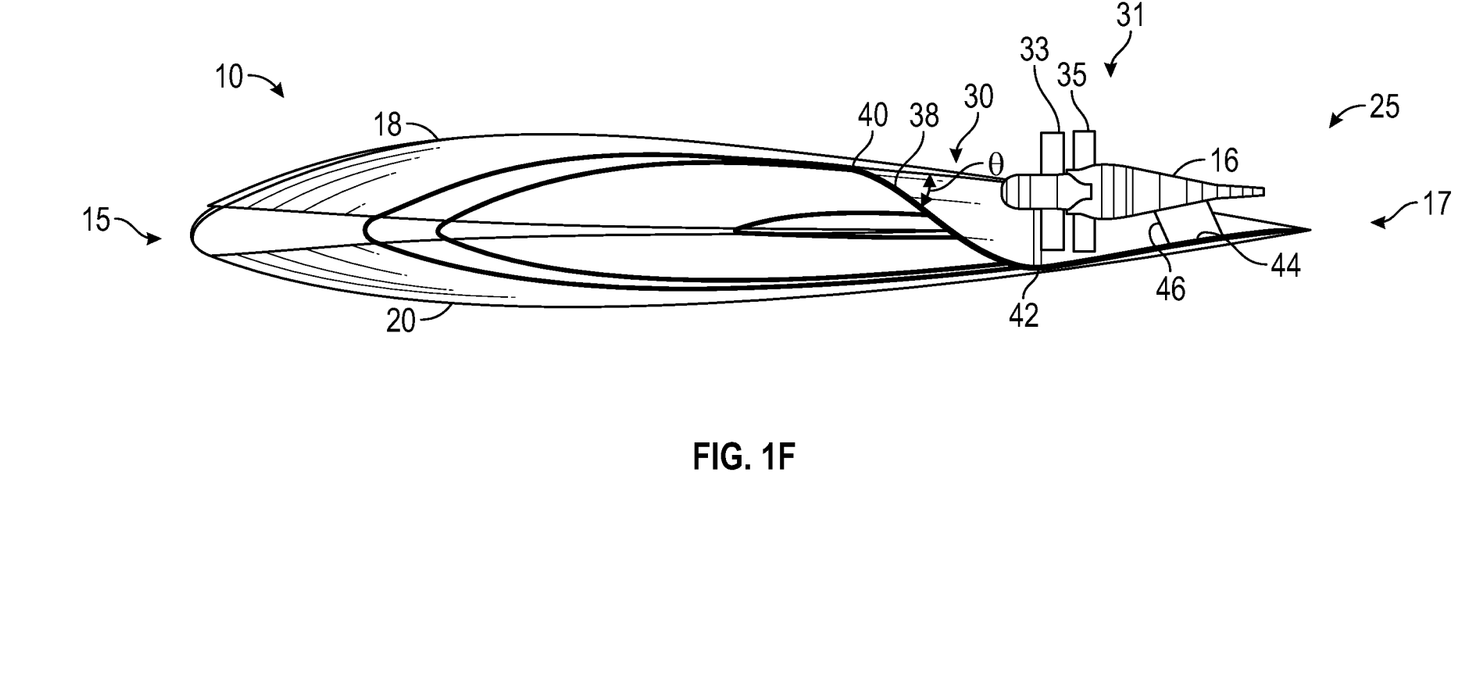
FIG. 1F is a side view of the exemplary blended wing body aircraft of FIG. 1A, according to an aspect of the present disclosure.

FIG. 1F is a side view of the BWB 10. In FIG. 1F, the blended wing section 14 is removed for clarity. As shown in FIG. 1F, the one or more grooves 30 each includes an axial contoured wall 38. The axial contoured wall 38 extends in the axial direction (A) and defines a contour in the upper body 18 of the body section 12. For example, the axial contoured wall 38 extends between a proximal, first end 40 and a distal, second end 42. The second end 42 is positioned aft of the first end 40. The axial contoured wall 38 is contoured between the first end 40 and the second end 42. The axial contoured wall 38 extends from the upper body 18 to an axial wall 44. For example, the axial contoured wall 38 blends into the axial wall 44. The axial wall 44 extends from the second end 42 of the axial contoured wall 38 to an aft end of the BWB 10. The axial wall 44 is located adjacent a top surface of the lower body 20. In this way, the axial contoured wall 38 blends into the lower body 20. In some examples, the axial wall 44 is radially spaced from the lower body 20 such that the axial contoured wall 38 does not blend into the lower body 20. The axial contoured wall 38 may include any shape and/or any size for embedding the open-fan engines 16 in the one or more grooves 30, as detailed further below.

The axial contoured wall 38 extends from the upper body 18 at a contour angle θ with respect to the upper body 18. For example, the axial contoured wall 38 includes a slope having the contour angle θ. The contour angle θ may be between about zero degrees and about ninety degrees (0° to 90°). In some examples, the contour angle θ may be between about zero degrees and about sixty degrees (0° to 60°). Preferably, the contour angle θ is between about zero degrees and about thirty degrees (0° to 30°) to provide a smooth transition between the upper body 18 and the axial contoured wall 38 such that the boundary layer does not separate at the one or more grooves 30. When the contour angle θ is greater than thirty degrees, the boundary layer may begin to separate. For example, when the contour angle θ is greater than forty-five degrees (45°), undesired flow distortion may occur in the one or more grooves 30. The flow distortion may reduce the efficiency of the open-fan engines 16 compared to a smooth boundary layer. Thus, the contour angle θ is preferably between zero degrees and thirty degrees to ensure that the boundary layer does not separate under substantially all flight conditions of the BWB 10.

Each of the open-fan engines 16 includes an unducted fan section 31 (shown in FIG. 1F). The unducted fan section 31 includes one or more fan rotors having a plurality of fan blades 33. The unducted fan section 31 also includes one or more outlet guide vanes 35. In the exemplary embodiment, the open-fan engines 16 each include one fan rotor stage and one outlet guide vane stage. The open-fan engines 16 may, of course, include any number of fan rotors or any number of outlet guide vane stages, as necessary. The outlet guide vanes 35 include a set of stationary vanes for directing the air flow from the fan rotor. The outlet guide vanes 35 may include variable guide vanes such that the outlet guide vanes 35 may be controlled to change a pitch of the outlet guide vanes 35. In some examples, the unducted fan section 31 includes a second fan rotor stage instead of the outlet guide vanes 35. The unducted fan section 31 may include any number of fan rotor stages and/or may include any number of outlet guide vane stages, as desired.

The unducted fan section 31 does not include a shroud or a duct surrounding the plurality of fan blades 33. In this way, the plurality of fan blades 33 are open such that the plurality of fan blades 33 do not include a cover. Thus, the open-fan engines 16 include an open rotor engine, also referred to as a propfan engine. Such engines provide a higher bypass ratio by utilizing external fan blades, and thus provide for an increase in propulsive efficiency as compared to ducted fan engines. Further, in certain exemplary embodiments, the fan rotor may define a rotor diameter of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

Various embodiments of the engine, such as the open-fan engines 16 depicted and described herein, may allow for normal subsonic aircraft cruise altitude operation at or above Mach 0.5, or above Mach 0.75, based on structures provided herein. In certain embodiments, the open-fan engines 16 allow for normal aircraft operation between Mach 0.55 and Mach 0.85, or between Mach 0.75 to Mach 0.85 at cruise altitude. In certain embodiments, the open-fan engines 16 allow for fan blade tip speeds at or less than seven hundred fifty feet per second (fps).

Additionally, it should be appreciated that ranges of power loading and/or of rotor blade tip speed may correspond to certain structures, core sizes, thrust outputs, etc., or to other structures at the core engine and the fan rotors. However, as previously stated, to the extent one or more structures provided herein may be known in the art, it should be appreciated that the present disclosure may include combinations of structures not previously known to combine, at least for reasons based in part on conflicting benefits versus losses, on desired modes of operation, or on other forms of teaching away in the art.

The open-fan engines 16 may be prone to crosswind effects, debris, and increased noise as compared to ducted fan engines due to the fans of the open-fan engines 16 being unducted and exposed to the environment. Thus, the open-fan engines 16 of the present disclosure are mounted in the one or more grooves 30, as detailed further below.

Each pylon 46 is attached to the axial wall 44 of a respective groove 30. Each pylon 46 is also attached to a respective open-fan engine 16 at a location aft of the unducted fan section 31. In this way, the pylons 46 attach the open-fan engines 16 to the BWB 10 in the grooves 30. Thus, the open-fan engines 16 are at least partially embedded within the boundary layer of the BWB 10. The boundary layer is a thin layer of air that flows over the surface (e.g., the upper body 18) of the BWB 10. The boundary layer is thinnest at the forward end 15 of the BWB 10 and thickest towards the aft end 17 of the BWB 10. The boundary layer includes lower velocity airflow compared to the velocity of the airflow passing over the BWB 10 outside of the boundary layer. The velocity of the airflow in the boundary layer increases from the top surface of the upper body 18 of the BWB 10 to a nominal limit where the boundary layer ends, and free stream airflow begins. Thus, the velocity of the airflow at the top surface of the upper body 18 is zero and the velocity of the airflow increases until the nominal limit of the boundary limit. Accordingly, the open-fan engines 16 are positioned for boundary layer ingestion. Boundary layer ingestion includes the open-fan engines 16 utilizing a portion of the boundary layer such that at least a portion of the plurality fan blades 33 ingest the portion of the boundary layer and the open-fan engines 16 accelerate the airflow of the boundary layer. Boundary layer ingestion provides for a reduction in noise, a reduction in emissions, and an increase in propulsive engine efficiency as compared to engines without the benefit of the present disclosure. Thus, the one or more grooves 30 enable the open-fan engines 16 of the present to be embedded generally below the upper body 18 to ingest the boundary layer, as detailed further below.

Figure 1G:
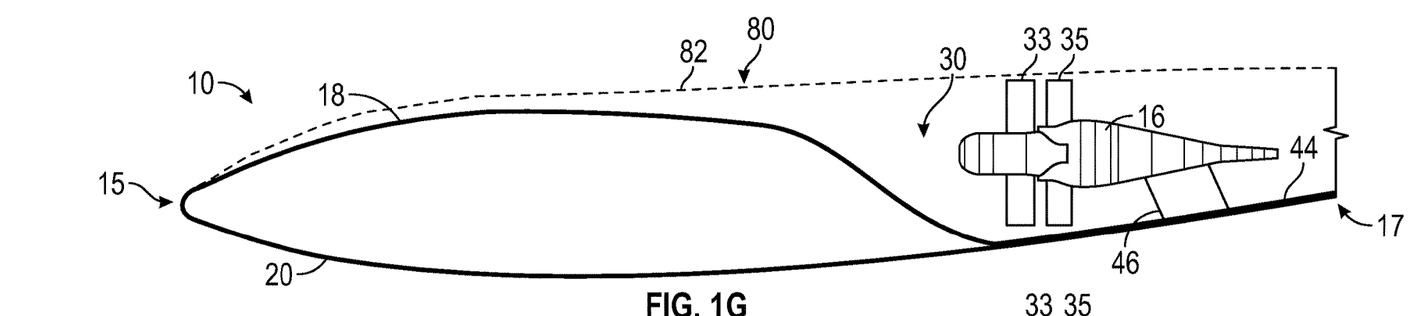
FIG. 1G is a schematic side view of the exemplary blended wing body aircraft of FIG. 1A, according to an aspect of the present disclosure.

FIG. 1G is a schematic side view of the BWB 10. As shown in FIG. 1G, the BWB 10 includes a boundary layer 80. The boundary layer 80 of the BWB 10 is defined as the thin layer of air from the upper body 18 of the BWB 10 to a nominal limit 82. The nominal limit 82 is an area where the boundary layer 80 ends and free stream airflow begins. Thus, a thickness of the boundary layer 80 is defined from the upper body 18 of the BWB 10 to the nominal limit 82.

As shown in FIG. 1G, the boundary layer 80 is thickest at the one or more grooves 30. Thus, the one or more grooves 30 allow the open-fan engines 16 to be mounted below the top surface of the upper body 18 such that the open-fan engines 16 are substantially fully embedded in the boundary layer 80. In this way, the open-fan engines 16 are mounted in the thickest area of the boundary layer 80 and the open-fan engines 16 ingest substantially an entirety of the boundary layer 80 (e.g., about one hundred percent). When the open-fan engines 16 are fully embedded or are partially embedded in the boundary layer 80, as detailed further below, the plurality of fan blades 33 are designed to withstand high loads (e.g., distortion) caused by the varying velocities of the airflow within the boundary layer 80. For example, the plurality of fan blades 33 may experience various radial or various circumferential pressure distributions due to the varying velocities of the air flow. In such instances, a portion of the plurality of fan blades 33 begin to experience flutter that may lead to failure of that portion of the plurality of fan blades 33. Thus, the plurality of fan blades 33 of the open-fan engines 16 include an aerodynamic and a stiff design to provide for distortion tolerance when the open-fan engines 16 are mounted within the boundary layer 80.

The one or more grooves 30 define a depth from which the one or more grooves 30 extend from the upper body 18 towards the lower body 20. The depth is defined from the upper body 18 to the axial wall 44 of the one or more grooves 30. In the embodiment of FIGS. 1A to 1G, the depth of the one or more grooves 30 is a maximum depth. For example, the axial contoured wall 38 extends from the upper body 18 to the lower body 20 such that the axial wall 44 is at the lower body 20 (shown in FIG. 1F). Such a depth of the one or more grooves 30 allows the open-fan engines 16 to be fully embedded in the boundary layer, as detailed further below. In such examples, the open-fan engines 16 are at least partially surrounded by the axial contoured wall 38 in the axial direction and are at least partially surrounded by the circumferential contoured wall 32 in the circumferential direction (as shown in FIGS. 1C, 1E, and 1F). Such a configuration provides for shielding the open-fan engines 16 from crosswind effects, protects the open-fan engines 16 from debris, and provides for acoustic propagation reduction for the open-fan engines 16. Thus, the one or more grooves 30 provide the benefits of a duct for the unducted, open-fan engines 16, while maintaining the efficiency increase provided by the open-fan engines 16, as detailed above. Such a depth of the one or more grooves 30 also provides for reduced overall weight of the BWB 10 as compared to BWB aircraft with shallower grooves or with no grooves.

Figure 2:
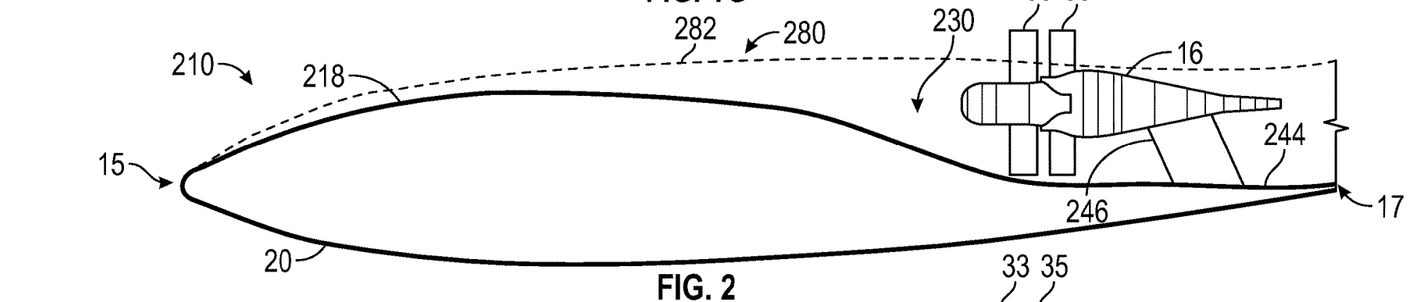
FIG. 2 is a schematic side view of another exemplary blended wing body aircraft, according to an aspect of the present disclosure.

FIG. 2 is a schematic side view of a blended wing body aircraft (BWB) 210, according to another embodiment. The BWB 210 includes an upper body 218 with one or more grooves 230 having a different configuration than the one or more grooves 30 of FIGS. 1A to 1G. In the embodiment of FIG. 2, the one or more grooves 230 include an axial wall 244 that is radially spaced from the lower body 20. For example, the one or more grooves 230 do not extend to the lower body 20. The depth of the one or more grooves 230 is greater than zero and less than the maximum depth of the one or more grooves 30. Such a depth of the one or more grooves 230 provides for a boundary layer 280 that includes a nominal limit 282 that is different than the nominal limit 82 of the boundary layer 80 of the BWB 10. In this way, the boundary layer 280 of the BWB 210 includes a different thickness at the one or more grooves 230 than the thickness of the boundary layer 80 at the one or more grooves 30 of the BWB 10. For example, the thickness of the boundary layer 280 is less than the thickness of the boundary layer 80. Such a depth of the one or more grooves 230 allows the open-fan engines 16 to be partially embedded within a boundary layer 280 of the BWB 210, while providing additional internal storage space in the BWB 210 compared to the BWB 10 in which the one or more grooves 30 are at a maximum depth. Such a configuration provides for less of an increase in the efficiency of the open-fan engines 16 compared to the BWB 10 in which the one or more grooves 30 are at a maximum depth.

The open-fan engines 16 are mounted on one or more pylons 246. The one or more pylons 246 are longer than the pylons 46 such that the plurality of blades 33 and the one or more outlet guide vanes 35 do not contact the axial wall 244 of the one or more grooves 230. The one or more pylons 246 may, of course, include any length for mounting the open-fan engines 16 within the boundary layer 280 of the BWB 210.

Figure 3:
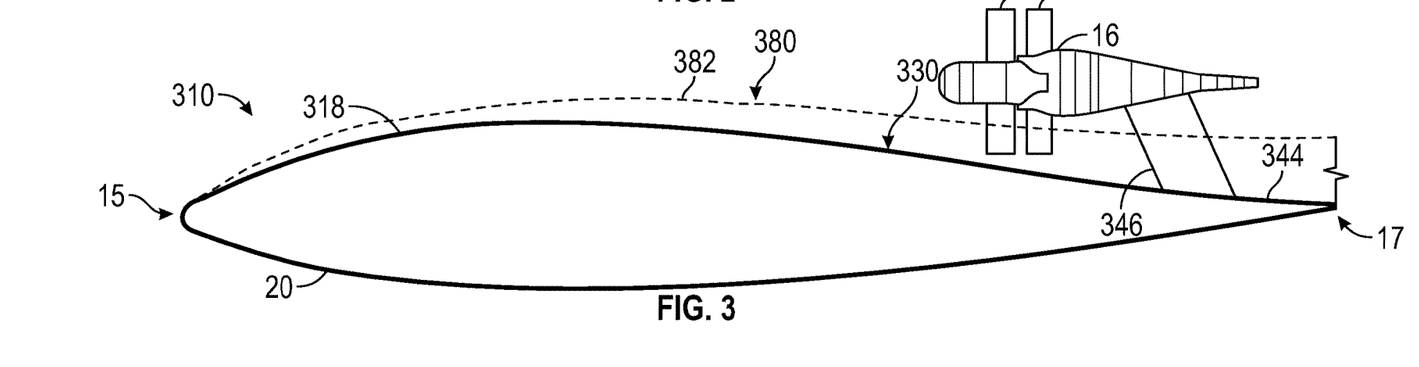
FIG. 3 is a schematic side view of another exemplary blended wing body aircraft, according to an aspect of the present disclosure.

FIG. 3 is a schematic side view of a blended wing body aircraft (BWB) 310, according to another embodiment. The BWB 310 includes an upper body 318 with one or more grooves 330 having a different configuration than the one or more grooves 30 of FIGS. 1A to 1G. In the embodiment of FIG. 3, the one or more grooves 330 include an axial wall 344 that is radially spaced from the lower body 20. For example, the one or more grooves 330 do not extend to the lower body 20. The depth of the one or more grooves 330 is greater than about zero and less than the depth of the one or more grooves 230 of the embodiment of FIG. 2. Such a depth of the one or more grooves 330 provides for a boundary layer 380 that includes a nominal limit 382 that is different than the nominal limit 82 of the boundary layer 80 of the BWB 10. In this way, the boundary layer 380 of the BWB 310 includes a different thickness at the one or more grooves 330 than the thickness of the boundary layer 80 at the one or more grooves 30 of the BWB 10. For example, the thickness of the boundary layer 380 at the one or more grooves 330 is less than the thickness of the boundary layer 80 at the one or more grooves 30 and less than the thickness of the boundary layer 280 at the one or more grooves 230. Such a depth of the one or more grooves 330 allows the open-fan engines 16 to be minimally embedded within the boundary layer 380, while providing a maximum internal storage space in the BWB 310 as compared to the BWB 210 and the BWB 10. Such a configuration provides for less of an increase in efficiency as compared to the embodiments of FIGS. 1G and 2. Further, such a configuration provides for minimal or no shielding from crosswind effects and provides for minimal or no shielding from debris. Thus, the depth of the one or more grooves 30, 230, 330 is selected based on maximizing the amount that the open-fan engines 16 can be embedded within the boundary layer 80, 280, 380 and providing for a shield for crosswind effects, for cross-debris effects, and for noise, while balancing for internal storage space of the BWB 10 and minimizing overall weight of the BWB 10.

The open-fan engines 16 are mounted on one or more pylons 346. The one or more pylons 346 are longer than the pylons 46 such that the plurality of blades 33 and the one or more outlet guide vanes 35 do not contact the axial wall 344 of the one or more grooves 230. The one or more pylons 346 may, of course, include any length for mounting the open-fan engines 16 within the boundary layer 380 of the BWB 310.

Figure 4:
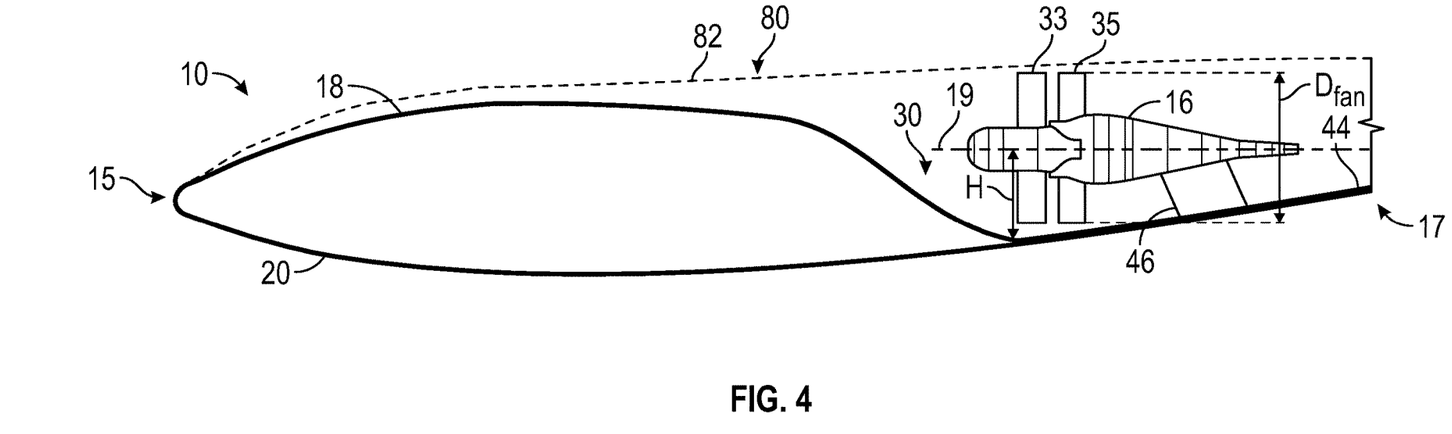
FIG. 4 is a schematic side view of the exemplary blended wing body aircraft of FIG. 1A, according to an aspect of the present disclosure.

FIG. 4 is a schematic side view of the BWB 10. The open-fan engines 16 include an engine immersion parameter, also referred to as a propulsor immersion parameter. The propulsor immersion parameter defines a height of the open-fan engines 16 with respect to the axial wall 44 when the open-fan engines 16 are mounted in the one or more grooves 30. In this way, the propulsor immersion parameter defines an amount that the open-fan engines 16 are embedded with respect to the upper body 18 of the body section 12. The propulsor immersion parameter includes a ratio of a height (H) of the open-fan engine 16 to a diameter ($D_{fan}$) of the open-fan engines 16. The height (H) is defined as a height measured from a bottom surface (e.g., the axial wall 44) of the one or more grooves 30 to a central longitudinal axis 19 of the open-fan engines 16. The diameter ($D_{fan}$) is defined as a diameter of the plurality of fan blades 33. Thus, the propulsor immersion parameter is defined as $H/D_{fan}$. In this way, the closer the propulsor immersion parameter is to zero, the closer the fan blades 33 are to the bottom surface of the one or more grooves 30 when the open-fan engines 16 are mounted in the one or more grooves 30. Likewise, the greater the propulsor immersion parameter is, the farther away the fan blades 33 are from the bottom surface of the one or more grooves 30 when the open-fan engines 16 are mounted in the one or more grooves 30.

The propulsor immersion parameter can be greater than about 0.5 and less than or equal to about 1.0. Such a range provides for radially positioning the open-fan engines 16 for boundary layer ingestion for increased propulsive efficiency, as detailed above. Preferably, the propulsor immersion parameter is about 0.5. In FIG. 4, the propulsor immersion parameter is about 0.5. When the propulsor immersion parameter is about 0.5, the open-fan engines 16 are substantially fully embedded within the boundary layer 80, and the open-fan engines 16 will gain the benefits of substantially full boundary layer ingestion, as discussed above. Further, when the propulsor immersion parameter is about 0.5, the plurality of fan blades 33 are positioned adjacent the bottom surface of the one or more grooves 30 without contacting the bottom surface of the one or more grooves 30. Radially positioning the open-fan engines 16 such that the propulsor immersion parameter is less than about 0.5 may provide for aerodynamic interference such that the propulsive efficiency of the open-fan engines 16 would be reduced compared to instances where the propulsor immersion parameter is greater than about 0.5.

Figure 5:
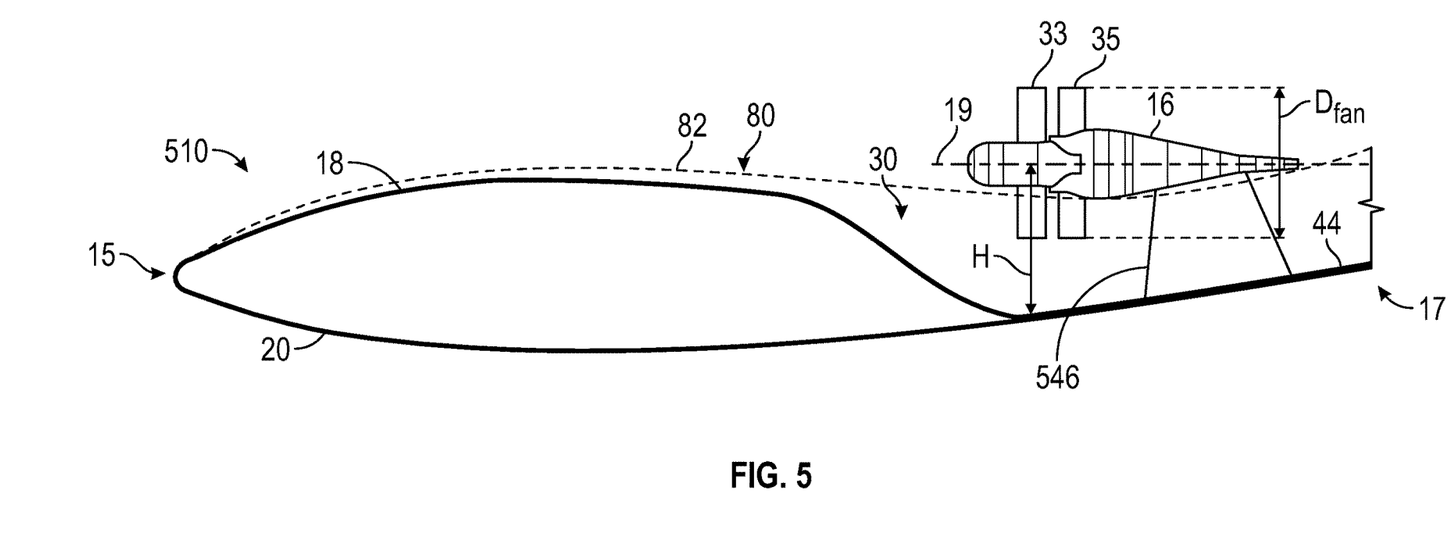
FIG. 5 is a schematic side view of another exemplary blended wing body aircraft, according to an aspect of the present disclosure.

FIG. 5 is a schematic side view of the BWB 10. In FIG. 5, the propulsor immersion parameter is about 1.0. When the propulsor immersion parameter is about 1.0, the open-fan engines 16 are partially embedded within the boundary layer 80 and only ingest a small portion of the boundary layer 80. As shown in FIG. 5, the open-fan engines 16 are mounted on one or more pylons 546. The one or more pylons 546 are longer than the pylons 46. In this way, the open-fan engines 16 are positioned generally above the upper body 18, and thus are mounted generally outside of the boundary layer 80, such that the open-fan engines 16 ingest only a small portion of the boundary layer 80 (e.g., less than about one percent). When the propulsor immersion parameter is greater than about 1.0, the efficiency of the open-fan engines 16 diminishes compared to when the propulsor immersion parameter is less than about 1.0.

Figure 6:
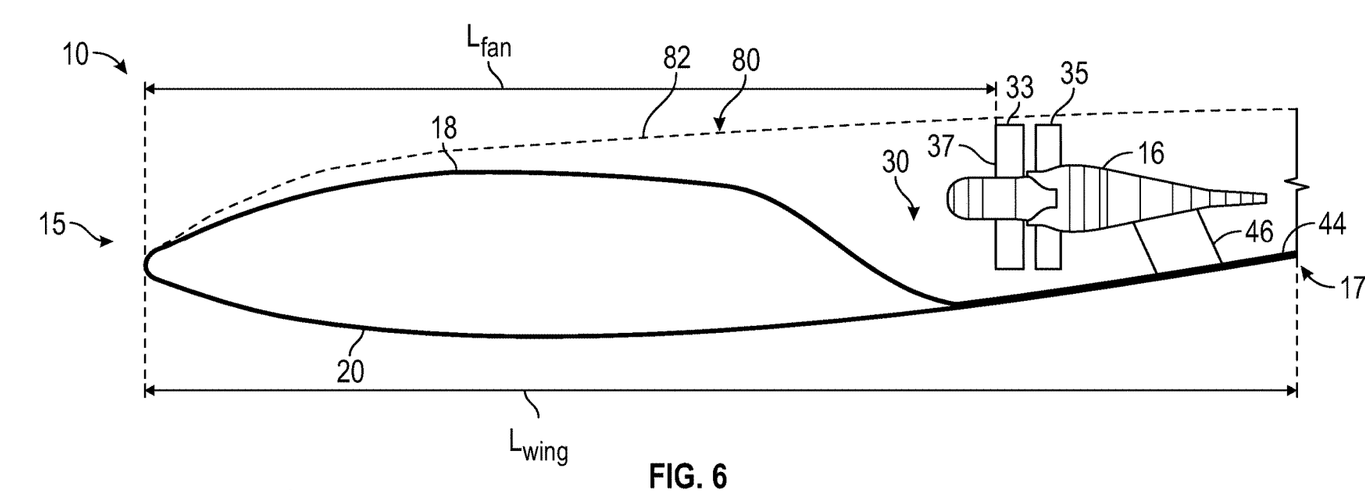
FIG. 6 is a schematic side view of the exemplary blended wing body aircraft of FIG. 1A, according to an aspect of the present disclosure.

FIG. 6 is a schematic side view of the BWB 10. The open-fan engines 16 include an engine axial position parameter, also referred to as a propulsor axial position parameter. The propulsor axial position parameter defines an axial position ($L_{fan}$) of the open-fan engines 16 with respect to a length ($L_{wing}$) of the BWB 10. The length ($L_{wing}$) of the BWB 10 is defined as an axial length from the forward end 15 to the aft end 17 of the BWB 10. The propulsor axial position parameter includes a ratio of the axial position ($L_{fan}$) of the open-fan engines 16 to the length (Loring) of the BWB 10. $L_{fan}$ is defined as a length measured from the forward end 15 of the BWB 10 to a leading edge (LE) 37 of a forwardmost fan blade 33. Thus, the propulsor axial position parameter is defined as $L_{fan}/L_{wing}$. In this way, the lesser the propulsor axial position parameter, the closer the open-fan engines 16 are to the forward end 15 of the BWB 10. Likewise, the greater the propulsor axial position parameter, the farther the open-fan engines 16 are from the forward end 15 of the BWB 10. The propulsor axial position parameter can be greater than about 0.2 and less than about 1.2. Such a range provides for the open-fan engines 16 to be mounted within a thicker portion of the boundary layer 80 as compared to the boundary layer 80 at the forward end 15 of the BWB 10, while also balancing the center of gravity of the BWB 10. For example, if the propulsor axial position parameter is less than 0.2, the boundary layer 80 may not be sufficiently thick enough such that the open-fan engines 16 could be fully embedded within the boundary layer 80. Further, if the propulsor axial position parameter is greater than 1.2, the center of gravity of the BWB 10 may be not be sufficiently balanced.

In the embodiment of FIG. 6, the propulsor axial position parameter is about 0.75. Preferably, the propulsor axial position parameter is greater than about 0.75 and less than about 1.0. Such a configuration provides for the open-fan engines 16 to be fully embedded in the boundary layer 80 for providing a maximum increase in propulsion efficiency compared to configurations in which the propulsor axial position parameter is closer to about 0.2.

Figure 7:
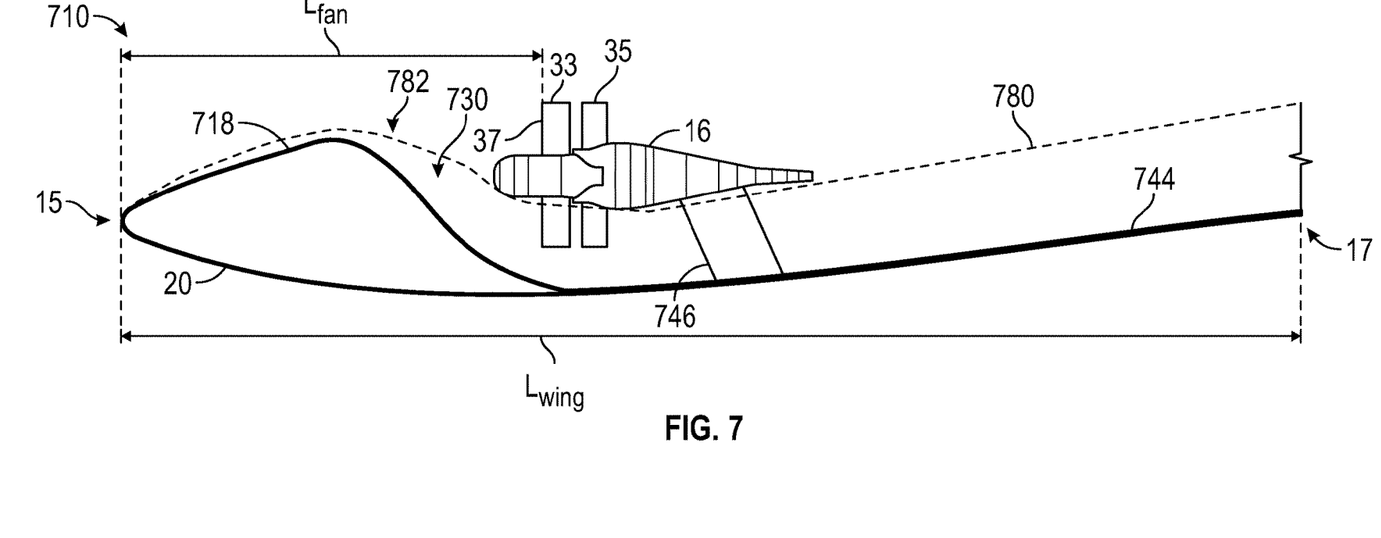
FIG. 7 is a schematic side view of another exemplary blended wing body aircraft, according to an aspect of the present disclosure.

FIG. 7 is a schematic side view of an exemplary blended wing body aircraft (BWB) 710, according to another embodiment. As shown in FIG. 7, the BWB 710 includes an upper body 718 with one or more grooves 730. The one or more grooves 730 are positioned closer to the forward end 15 than the one or more grooves 30 of the BWB 10. Such a positioning of the one or more grooves 730 provides for a boundary layer 780 that includes a nominal limit 782 that is different than the nominal limit 82 of the boundary layer 80 (FIG. 1G) of the BWB 10. For example, the boundary layer 780 is thinner than the boundary layer 80. An axial wall 744 of the one or more grooves 30 may be longer than the axial wall 44 of the one or more grooves 30 of the BWB 10. The open-fan engines 16 are mounted on one or more pylons 746. The one or more pylons 746 are longer than the pylons 46 such that the plurality of blades 33 and the one or more outlet guide vanes 35 do not contact the axial wall 744 of the one or more grooves 730. The one or more pylons 746 may, of course, include any length for mounting the open-fan engines 16 within the boundary layer 780 of the BWB 710.

In the embodiment of FIG. 7, the propulsor axial position parameter is greater than about 0.2 and less than about 0.5. Accordingly, the open-fan engines 16 are positioned closer to the forward end 15 as compared to the positioning of the open-fan engines 16 on the BWB 10. In this way, the open-fan engines 16 are partially embedded in the boundary layer 780. Such a configuration includes less of an increase in propulsive efficiency of the open-fan engines 16 compared to a configuration in which the propulsor axial position parameter is greater than about 0.75 and less than about 1.0. Further, such a configuration provides for greater weight reduction, but smaller storage space as compared to configurations in which the propulsor axial position parameter is greater than about 0.75 and less than about 1.0. In the embodiment of FIG. 7, the open-fan engines 16 are partially embedded in the boundary layer 780. For example, the open-fan engines 16 ingest about twenty percent of the boundary layer 780.

Figure 8A:
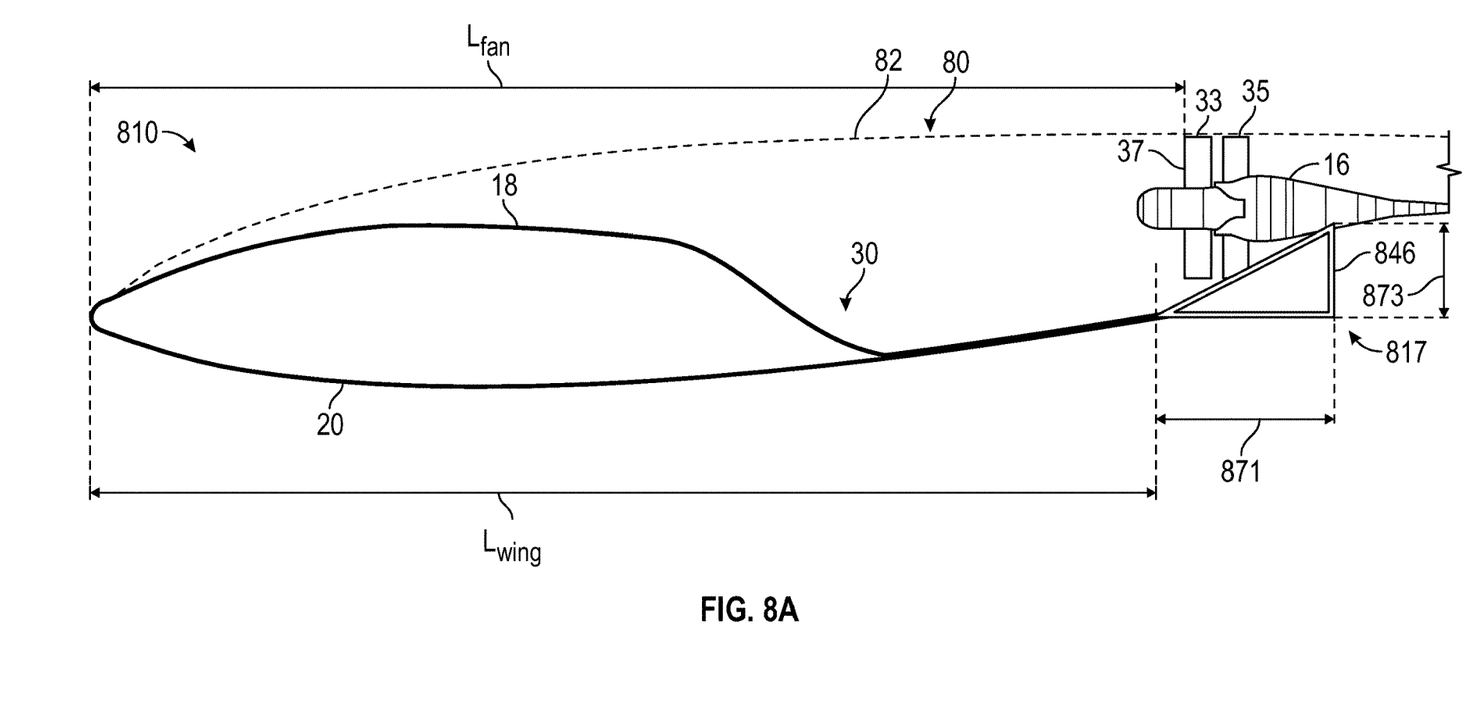
FIG. 8A is a schematic side view of another exemplary blended wing body aircraft, according to an aspect of the present disclosure.
Figure 8B:
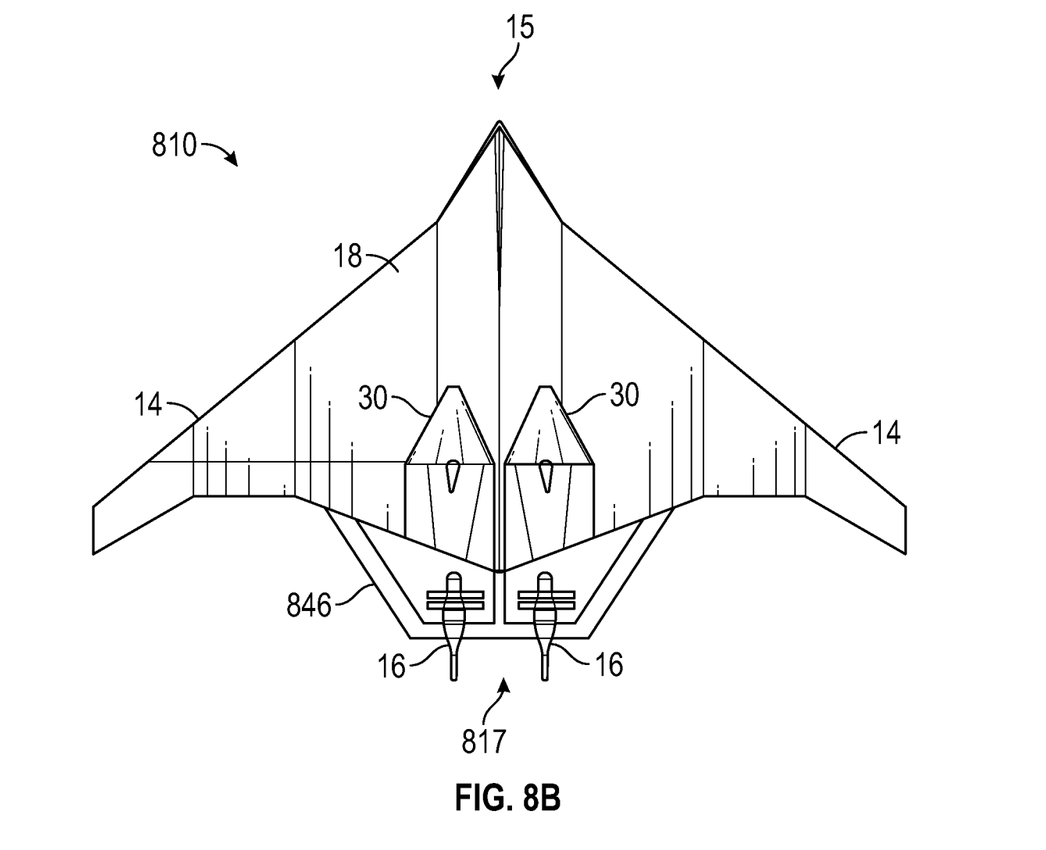
FIG. 8B is a top view of the exemplary blended wing body aircraft of FIG. 8A, according to an aspect of the present disclosure.

FIG. 8A is a schematic side view of an exemplary blended wing body aircraft (BWB) 810, according to another embodiment. FIG. 8B is a top view of the BWB 810. As shown in FIGS. 8A and 8B, the open-fan engines 16 are mounted aft of the one or more grooves 30 of the BWB 810. The open-fan engines 16 are attached to the one or more grooves 30 by a pylon 846. In this way, the pylon 846 extends aft from the one or more grooves 30 of the BWB 810 to the open-fan engines 16 and an aft end 817 of the BWB 810 extends longer than the aft end 17 of the BWB 10.

In the embodiment of FIGS. 8A and 8B, the pylon 846 includes a single integral structure. The pylon 846 includes an axial length 871 and a radial height 873. The axial length 871 of the pylon 846 is defined as a length from a location at which the pylon 846 mounted on the BWB 810, to a position on the open-fan engines 16 at which the pylon 846 is mounted. The radial height 873 is defined as a height from a location at which the pylon 846 is mounted on the BWB 810, to a location at which the pylon 846 is mounted to the open-fan engines 16. In this way, the open-fan engines 16 are mounted aft of the one or more grooves 30 and radially above the one or more grooves 30. Accordingly, the pylon 846 allows the open-fan engines 16 to be positioned aft of the one or more grooves 30 and still be fully embedded within the boundary layer 80. The radial height 873 of the pylon 846 may be chosen such that the propulsor immersion parameter is greater than about 0.5 and less than or equal to about 1.0, as detailed above.

In the embodiment of FIGS. 8A and 8B, the propulsor axial position parameter is greater than 1.0. Such a configuration provides for fully embedding the open-fan engines 16 in the boundary layer 80 (FIG. 8A), but does not provide for acoustic shielding, for protection from crosswind effects, or for cross-debris protection. Further, the pylons 846 in such a configuration are larger than the pylons 46 of the BWB 10, and thus increase overall weight of the BWB 810. Preferably, the propulsor axial position parameter is greater than about 0.75 and less than about 1.0, as detailed above, in order to fully embed the open-fan engines 16 within the boundary layer 80 at a thickest area of the boundary layer 80, while also providing a balanced center of gravity of the BWB 10 and providing a shield for protecting the open-fan engines 16 from crosswind effects, from cross-debris effects, and from noise.

Figure 9:
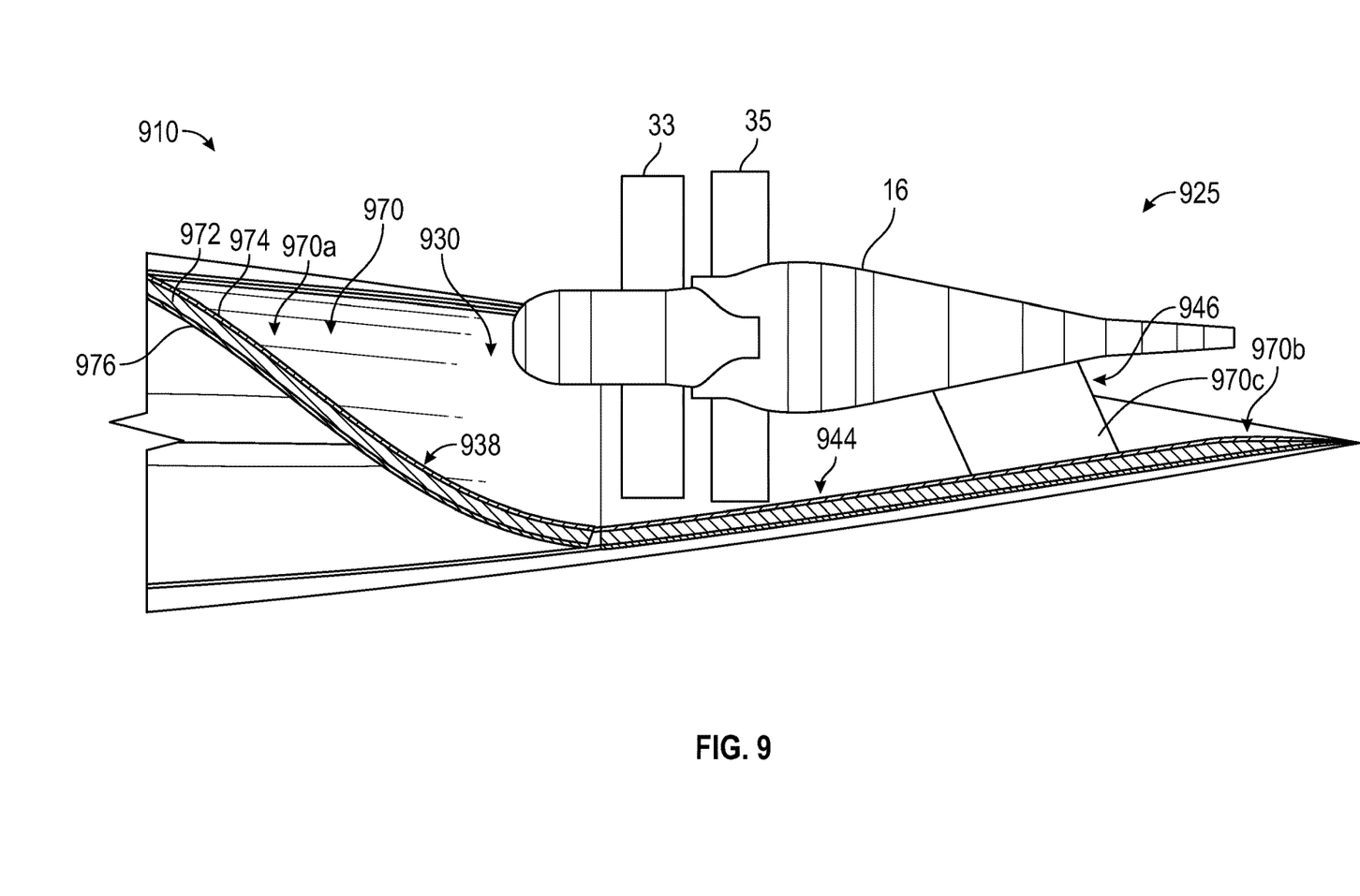
FIG. 9 is an enlarged side view of another exemplary blended wing body aircraft, according to an aspect of the present disclosure.

FIG. 9 is an enlarged side view of an aft region 925 of an exemplary blended wing body aircraft (BWB) 910, according to another embodiment. As shown in FIG. 9, the BWB 910 includes one or more grooves 930. The one or more grooves 930 may be any of the grooves 30, 230, 330, 730, as detailed above. The BWB 910 includes an acoustic liner 970 arranged in the one or more grooves 930. An example of the acoustic liner 970 is the acoustic liner shown and described in U.S. Patent Application Publication No. 2022/0025814, the disclosure of which is incorporated by reference herein in its entirety. The acoustic liner 970 provides for damping or attenuating sound waves, including sound waves associated with the open-fan engines 16. The acoustic liner 970 includes an acoustic core 972 positioned between an acoustic screen 974 and a substantially imperforate back sheet 976. In some examples, the acoustic screen 974 includes a perforated plate, a mesh (e.g., formed of wire, cloth, fibers, and/or filaments), or a combination thereof. The acoustic core 972 is made up of hollow cellular structures or of resonant cells disposed between the acoustic screen 974 and the back sheet 976. The resonant cells include a plurality of cell walls that define a hollow resonant space. The acoustic liner 970 is mounted within the one or more grooves 930. For example, the acoustic liner 970 may be mounted by bonding (e.g., adhesive), by fastening mechanisms (e.g., bolts, or the like), or by flanges.

As shown in FIG. 9, the acoustic liner 970 includes two such acoustic liners 970a, 970b. A first acoustic liner 970a is mounted on an axial contoured wall 938 of the one or more grooves 930. A second acoustic liner 970b is mounted on an axial wall 944. In some examples, the acoustic liner 970a and the acoustic liner 970b may form a single acoustic liner 970. In some examples, the acoustic liner 970 is mounted on the circumferential contoured wall 32 (FIG. 1). The acoustic liner 970 may be mounted anywhere within the one or more grooves 930 to provide for acoustic dampening of the open-fan engines 16. In some examples, a third acoustic liner 970c is also mounted on one or more pylons 946. Thus, the acoustic liner 970 provides for additional acoustic damping or attenuation in addition to the acoustic damping provided by the one or more grooves 930, as detailed above. The acoustic liner 970 also includes a strength for withstanding impacts, such as impacts from failure loads (e.g., engine blade out).

The embodiments of the present disclosure provide for open-fan engines to be mounted within one or more grooves of a BWB such that the open-fan engines are embedded within a boundary layer of the BWB for boundary layer ingestion. In this way, the embodiments disclosed herein improve overall propulsive efficiency of the open-fan architecture engines as compared to BWBs without the benefit of the present disclosure. Further, embedding the open-fan engines within the blended wing body partially blocks or fully blocks the direct line-of-sight noise propagation of the open-fan engines such that environmental noise is reduced and community noise that propagates from the open-fan engines to the ground is reduced. Acoustic liners in the one or more grooves help to reduce noise reflections and noise that grazes along and around the BWB. The acoustic liners also reduce noise that propagates into the aircraft cabin.

Further, mounting the open-fan engines within one or more grooves provides for shielding the open-fan engines from crosswind effects and cross-engine debris. The one or more grooves also provide acoustic dampening effects for the open-fan engines. Thus, the one or more grooves of the present disclosure allow the open-fan engines to be mounted within the boundary layer of the BWB, while also providing benefits of ducted fan engines (e.g., acoustic dampening, protection from crosswind effects and cross-engine debris) without actually utilizing a ducted fan engine.

Further aspects of the present disclosure are provided by the subject matter of the following clauses.

A blended wing body aircraft including a body section, a plurality of blended wing sections, and one or more open-fan engines. The body section has an aerodynamic lifting surface. The body section includes an upper body and a lower body. The plurality of blended wing sections further define the body section. The one or more grooves are in the body section and the one or more grooves extend from the upper body towards the lower body. The one or more open-fan engines are mounted at least partially within the one or more grooves. The one or more open-fan engines ingest a portion of a boundary layer of the blended wing body aircraft.

The blended wing body aircraft of the preceding clause, wherein the one or more grooves extend to the lower body.

The blended wing body aircraft of any preceding clause, further including an acoustic liner mounted to the one or more grooves.

The blended wing body aircraft of any preceding clause, further including an acoustic liner mounted on a pylon of each of the one or more open-fan engines.

The blended wing body aircraft of any preceding clause, the one or more open-fan engines being positioned within the one or more grooves to ingest at least one percent of the boundary layer of the blended wing body aircraft.

The blended wing body aircraft of any preceding clause, an amount of the boundary layer ingested by the one or more open-fan engines being a function of an axial position and a radial position of the one or more open-fan engines with respect to the blended wing body aircraft.

The blended wing body aircraft of any preceding clause, the one or more open-fan engines are characterized by a propulsor immersion parameter. The propulsor immersion parameter is greater than about 0.5 and less than or equal to about 1.0.

The blended wing body aircraft of any preceding clause, the propulsor immersion parameter is about 0.5.

The blended wing body aircraft of any preceding clause, the propulsor immersion parameter being defined by a relationship of a height of the one or more open-fan engines from a bottom surface of the one or more grooves to a central longitudinal axis of the one or more open-fan engines, and a diameter of the one or more open-fan engines.

The blended wing body aircraft of any preceding clause, the one or more open-fan engines being characterized by a propulsor axial position parameter. The propulsor axial position parameter is greater than about 0.2 and less than about 1.2.

The blended wing body aircraft of any preceding clause, the propulsor axial position parameter is greater than about 0.75 and less than about 1.0.

The blended wing body aircraft of any preceding clause, the propulsor axial position parameter being defined by an axial position of the one or more open-fan engines and an axial length of the blended wing body aircraft.

The blended wing body aircraft of any preceding clause, the one or more grooves including an axial contoured wall and a circumferential contoured wall.

The blended wing body aircraft of any preceding clause, the axial contoured wall extending from the upper body of the body section at a contour angle between about zero degrees and about thirty degrees.

The blended wing body aircraft of any preceding clause, the circumferential contoured wall being generally U-shaped.

A blended wing body aircraft including a body section, a plurality of blended wing sections, one or more grooves in the body section, and one or more open-fan engines. The body section has an aerodynamic lifting surface. The body section includes an upper body and a lower body. The plurality of blended wing sections further define the body section. The one or more grooves are in the body section, the one or more grooves including an axial contoured wall extending from the upper body towards the lower body. The circumferential contoured wall extends from the upper body towards the lower body. The one or more open-fan engines are mounted within the one or more grooves. The one or more open-fan engines ingest at least one percent of a boundary layer of the blended wing body aircraft.

The blended wing body aircraft of any preceding clause, the one or more open-fan engines being characterized by a propulsor immersion parameter. The propulsor immersion parameter is greater than about 0.5 and less than or equal to about 1.0.

The blended wing body aircraft of any preceding clause, the propulsor immersion parameter being about 0.5.

The blended wing body aircraft of any preceding clause, the one or more open-fan engines being characterized by a propulsor axial position parameter. The propulsor axial position parameter is greater than about 0.2 and less than about 1.2.

The blended wing body aircraft of any preceding clause, the propulsor axial position parameter being greater than about 0.75 and less than about 1.0.

The blended wing body aircraft of any preceding clause, the one or more grooves extending to the lower body.

The blended wing body aircraft of any preceding clause, further including an acoustic liner mounted to the one or more grooves.

The blended wing body aircraft of any preceding clause, further including an acoustic liner mounted on a pylon of each of the one or more open-fan engines.

The blended wing body aircraft of any preceding clause, an amount of the boundary layer ingested by the one or more open-fan engines being a function of an axial position and a radial position of the one or more open-fan engines with respect to the blended wing body aircraft.

The blended wing body aircraft of any preceding clause, the propulsor immersion parameter being defined by a relationship of a height of the one or more open-fan engines from a bottom surface of the one or more grooves to a central longitudinal axis of the one or more open-fan engines, and a diameter of the one or more open-fan engines.

The blended wing body aircraft of any preceding clause, the propulsor axial position parameter being defined by an axial position of the one or more open-fan engines and an axial length of the blended wing body aircraft.

The blended wing body aircraft of any preceding clause, the axial contoured wall extending from the upper body of the body section at a contour angle between about zero degrees and about thirty degrees.

The blended wing body aircraft of any preceding clause, the circumferential contoured wall being generally U-shaped.

Although the foregoing description is directed to the preferred embodiments, other variations and modifications will be apparent to those skilled in the art and may be made without departing from the spirit or the scope of the disclosure. Moreover, features described in connection with one embodiment may be used in conjunction with other embodiments, even if not explicitly stated above.

The invention claimed is:

1. A blended wing body aircraft comprising:
   one or more open-fan engines each including an unducted fan section having a plurality of fan blades; and
   a body section blended with a plurality of wing sections each defining an aerodynamic lifting surface, the body section including (a) an upper body, (b) a lower body, and (c) one or more grooves, the one or more grooves including (i) an axial contoured wall extending from the upper body towards the lower body upstream of the one or more open-fan engines at an upper contour angle relative to the upper body, (ii) a bottom surface blending with the axial contoured wall and extending downstream of the axial contoured wall towards an aft end of the body section, the bottom surface extending towards the upper body at a bottom contour angle relative to the lower body, and (iii) a circumferential contoured wall extending from the upper body towards the lower body that blends with the bottom surface and the axial contoured wall, wherein air flows over the body section and the plurality of wing sections and forms a boundary layer over the upper body, the boundary layer being thickest at the one or more grooves,
   wherein the one or more open-fan engines are mounted at least partially within the one or more grooves such that the plurality of fan blades extends beyond the upper body, the one or more open-fan engines are spaced from the bottom surface of the one or more grooves, and the one or more open-fan engines ingest substantially an entirety of the boundary layer, and wherein the one or more open-fan engines are characterized by a propulsor immersion parameter that is defined by a relationship of a height of the one or more open-fan engines from the bottom surface of the one or more grooves to a central longitudinal axis of the one or more open-fan engines, and a diameter of the plurality of fan blades of the one or more open-fan engines, the propulsor immersion parameter being greater than 0.5 and less than or equal to about 1.0.

2. The blended wing body aircraft of claim 1, wherein an amount of the boundary layer ingested by the one or more open-fan engines is a function of an axial position and a radial position of the one or more open-fan engines with respect to the blended wing body aircraft.

3. The blended wing body aircraft of claim 1, wherein the one or more open-fan engines are characterized by a propulsor axial position parameter that is defined by an axial position of the one or more open-fan engines and an axial length of the blended wing body aircraft, the propulsor axial position parameter being greater than about 0.2 and less than about 1.2.

4. The blended wing body aircraft of claim 3, wherein the propulsor axial position parameter is greater than about 0.75 and less than about 1.0.

5. The blended wing body aircraft of claim 1, wherein the axial contoured wall extends from the upper body of the body section at a contour angle between about zero degrees and about thirty degrees.

6. The blended wing body aircraft of claim 1, wherein the circumferential contoured wall is generally U-shaped.

7. A blended wing body aircraft comprising:
   one or more open-fan engines including an unducted fan section having a plurality of fan blades;
   one or more pylons that mount the one or more open-fan engines; and
   a body section blended with a plurality of wing sections each defining an aerodynamic lifting surface, the body section including (a) an upper body, (b) a lower body, and (c) one or more grooves, the one or more grooves including (i) an axial contoured wall extending from the upper body towards the lower body upstream of the one or more open-fan engines at an upper contour angle relative to the upper body, (ii) a bottom surface blending with the axial contoured wall and extending downstream of the axial contoured wall towards an aft end of the body section, the bottom surface extending towards the upper body at a bottom contour angle relative to the lower body, and (iii) a circumferential contoured wall extending from the upper body towards the lower body that blends with the bottom surface and the axial contoured wall, wherein air flows over the body section and the plurality of wing sections and forms a boundary layer over the upper body, the boundary layer being thickest at the one or more grooves,
   wherein the one or more pylons are attached to the bottom surface of the one or more grooves, and the one or more pylons mount the one or more open-fan engines at least partially within the one or more grooves such that the plurality of fan blades extends beyond the upper body, the one or more open-fan engines are spaced from the bottom surface of the one or more grooves, and the one or more open-fan engines ingest substantially an entirety of the boundary layer.

8. The blended wing body aircraft of claim 7, wherein the one or more open-fan engines are characterized by a propulsor immersion parameter that is defined by a relationship of a height of the one or more open-fan engines from the bottom surface of the one or more grooves to a central longitudinal axis of the one or more open-fan engines, and a diameter of the one or more open-fan engines, the propulsor immersion parameter being greater than about 0.5 and less than or equal to about 1.0.

9. The blended wing body aircraft of claim 8, wherein the propulsor immersion parameter is about 0.5.

10. The blended wing body aircraft of claim 7, wherein the one or more open-fan engines are characterized by a propulsor axial position parameter that is defined by an axial position of the one or more open-fan engines and an axial length of the blended wing body aircraft, the propulsor axial position parameter being greater than about 0.2 and less than about 1.2.

11. The blended wing body aircraft of claim 10, wherein the propulsor axial position parameter is greater than about 0.75 and less than about 1.0.

12. The blended wing body aircraft of claim 1, wherein the one or more grooves provide acoustic dampening effects for the one or more open-fan engines.

13. The blended wing body aircraft of claim 1, wherein the plurality of wing sections are structurally blended with the body section such that the plurality of wing sections and the body section define a substantially uninterrupted wing member.

14. The blended wing body aircraft of claim 7, wherein the upper contour angle of the axial contoured wall is between about zero degrees and about thirty degrees.

15. The blended wing body aircraft of claim 7, wherein the one or more grooves extend to the lower body.

16. The blended wing body aircraft of claim 7, wherein the circumferential contoured wall is generally U-shaped.

\* \* \* \* \*